United States Patent
Hawkins et al.

(10) Patent No.: US 6,361,684 B1
(45) Date of Patent: Mar. 26, 2002

(54) INTEGRATED FUEL PUMP AND FUEL FILTER WITH FUEL-WATER SEPARATION

(75) Inventors: Charles W. Hawkins, Sparta; Ismail Bagci; Zemin Jiang, both of Cookeville, all of TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/567,922

(22) Filed: May 10, 2000

(51) Int. Cl.[7] ............................................... B01D 17/12
(52) U.S. Cl. ....................... 210/91; 210/149; 210/184; 210/299; 210/416.4; 210/443
(58) Field of Search .................. 210/91, 120, 149, 210/184, 295, 299, 440, 443, 416.4, 232; 123/509; 417/323, 363, 364

(56) References Cited

U.S. PATENT DOCUMENTS

| | | | |
|---|---|---|---|
| 3,150,601 A | * | 9/1964 | Smith et al. |
| 3,254,769 A | | 6/1966 | McArthur ................... 210/194 |
| 3,409,135 A | * | 11/1968 | Bradley et al. .......... 210/416.1 |
| 5,392,750 A | | 2/1995 | Laue et al. .................. 123/509 |
| 5,511,957 A | | 4/1996 | Tuckey et al. .............. 417/313 |
| 5,564,396 A | | 10/1996 | Kleppner et al. ........... 123/509 |
| 5,699,773 A | | 12/1997 | Kleppner et al. ........... 123/510 |
| 5,758,627 A | | 6/1998 | Minagawa et al. ......... 123/509 |
| 5,782,223 A | | 7/1998 | Yamashita et al. .......... 123/510 |
| 5,785,032 A | | 7/1998 | Yamashita et al. .......... 123/509 |
| 5,855,772 A | * | 1/1999 | Miller et al. ................... 210/86 |
| 5,860,796 A | | 1/1999 | Clausen .................... 417/423.9 |
| 5,876,599 A | | 3/1999 | Sylvester et al. ........... 210/232 |
| 5,900,148 A | | 5/1999 | Izutani et al. ............. 210/416.4 |
| 5,958,237 A | | 9/1999 | Cort et al. ............... 210/416.4 |

* cited by examiner

Primary Examiner—Joseph W. Drodge
(74) Attorney, Agent, or Firm—Woodard, Emhardt, Naughton, Moriarty & McNett

(57) ABSTRACT

A fuel filter assembly for the filtering of a flow of fuel includes an outer shell defining a hollow interior and, at a first end, a fuel inlet passageway, a fuel outlet passageway, and a water collection region. The outer shell has a second end which is open and constructed and arranged to be closed by a removable lid. Installed within the hollow interior of the outer shell is a fuel filter cartridge which includes a filter element constructed and arranged for water separation. The filter element defines an interior space into which a fuel transfer pump is installed and which is operable to push fuel through the filter element. Included as part of the fuel filter assembly is a filter detector control circuit including a normally-open filter detector switch which is electrically and operably coupled to the fuel transfer pump. A plunger on the filter detector switch must be depressed in order to close the circuit and enable operation of the fuel transfer pump. The plunger is depressed only upon the installation of the fuel filter cartridge, thereby preventing the delivery of fuel to a downstream location unless a fuel filter cartridge is properly installed. Also included as part of the fuel filter assembly is a fuel heater, a temperature sensor, a drain valve, and a diagnostic port.

22 Claims, 4 Drawing Sheets

INTEGRATED FUEL PUMP AND FUEL FILTER WITH FUEL-WATER SEPARATION

BACKGROUND OF THE INVENTION

The present invention relates in general to the structural and functional combination of a fuel filter and a fuel-water separation unit. More specifically, the present invention relates to such a combination which includes an "integrated" fuel pump with selected operational safeguards.

In the field of diesel engine technology, it is common to use fuel injection systems. Such fuel injection systems include small, closely toleranced apertures and clearances with precision machining and matching of cooperating components. The proper functioning of these components and of the fuel injection system generally depends, in part, on the fuel reaching these components being free of contaminants, at least of a magnitude which could affect performance. If the fuel is not adequately or properly filtered, the fuel injection system components are exposed to possible damage and subjected to premature wear. Other concerns with the delivery and use of fuel which is not adequately or properly filtered include inefficient combustion, high fuel consumption, poor starting, rough idle, and reduced engine power.

Many diesel engines use a transfer or fuel supply pump to aid in the delivery of fuel from the fuel tank, through the fuel filter and other components, to the inlet of a high-pressure gear pump such as a fuel-injection pump. The use of this transfer pump aids in priming of the fuel system, supplying pressurized fuel, and increases the useful life of the fuel filter. Very often the transfer pump is mounted in a remote location that then requires the use of extra hoses, connectors, clamps, etc. An integrated fuel filter and pump assembly designed to reduce the part count and simplify installation would be an improvement to such systems and would be of significant economic benefit to the OEM of the diesel engine.

Another consideration when a transfer pump is employed is the locating of this pump within the fuel flow path relative to the location of the fuel filter. When the transfer pump is downstream from the fuel filter, the fuel is actually pulled through the fuel filter by suction, as contrasted to a fluid pushing force directing the fluid through the filter when the transfer pump is located at a point which is upstream from the fuel filter. While the differences between an upstream location and a downstream location might seem inconsequential, they are not. There are substantial pressure and force differences because typically the maximum system vacuum level is between 5 and 7 psi and, with a fuel filter placed in the line, the allowable restriction across the suction side of the fuel filter could be limited, typically 1 to 3 psi. The available pushing force of a transfer pump located on the upstream side of the fuel filter is over 30 psi. The allowable restriction across the pressure side of the fuel filter could be over 5 psi.

It is desirable to have a higher rather than a lower pressure applied to the fuel filter. For example, if organic, heavy fuel droplets are present, it is preferable to push these droplets through the filter so that they can be burned during the combustion cycle. With a lower pressure system, these droplets are not pulled through the filter and thus build up on the filter element. The reduced flow which this causes shows a "false" or premature indication of filter plugging and may confuse the user into believing that it is time to replace the filter element. Another benefit of a higher input pressure to push the fuel through the filter rather than pulling or suctioning the fuel through the filter involves the creation of vapor bubbles. If the suctioning force (5 to 7 psi) is too high in view of the filter restriction (1 to 3 psi), vapor bubbles can be created in the fuel line. When these vapor bubbles are introduced into the fuel injection system, they result in inefficient engine operation and the result is lower power. The creation of an apparent low power condition may confuse the operator into believing that the fuel filter is restricted, causing shutdown and (premature) element replacement.

As should be understood, it would be an improvement to incorporate an upstream fuel transfer pump with a fuel filter so that the number of connection parts can be reduced and the benefit of using a high pressure pushing force realized. By configuring the housing of the integrated combination for mounting to an engine, packaging and servicing efficiencies result. By separately interfacing the filter element (or cartridge) and the fuel transfer pump with the remainder of the assembly, it is easy to change the filter cartridge without needing to disturb or disassemble the fuel transfer pump. A safety interlock as part of the present invention precludes the delivery of fuel, by disabling the fuel transfer pump, unless a filter cartridge is properly installed in the filter housing.

One desirable design feature of a fuel filter assembly is to configure the fuel filter assembly with a water separation capability. It is the design of the filtering element and the configuration of the fuel flow path which provides this water separation capability. The water which is separated is then collected in the vicinity of a drain opening (valve controlled) and due to density differences, the water stays below the fuel which is being processed by the filter. A water-in-fuel sensor indicates when the accumulated water is to be drained. Other desirable design features of a fuel filter assembly include configuring the fuel filter assembly with such items as a temperature sensor, a fuel heater, a diagnostic port, and a fuel strainer. A corresponding design challenge is to be able to incorporate all of these features and components, along with the fuel transfer pump, into a single assembly with a size and shape which is compatible with current diesel engine designs and with the current space allocations in such diesel engine designs for the fuel filter assembly. The present invention answers this design challenge in a novel and unobvious manner.

SUMMARY OF THE INVENTION

A fuel filter assembly for filtering a flow of fuel according to one embodiment of the present invention comprises an outer shell defining a hollow interior and, at a first end, a fuel inlet passageway, a fuel outlet passageway, and a water collection region, the outer shell having a second end which is open and constructed and arranged to be closed by receipt of a closing member, a fuel filter cartridge installed into the hollow interior, the fuel filter cartridge including a filter element which defines an interior space and which is constructed and arranged for water separation, a fuel transfer pump installed into the interior space and being operable to push fuel through the filter element, and a removable lid constructed and arranged for receipt by the outer shell for closing the second end.

One object of the present invention is to provide an improved fuel filter assembly which includes a fuel transfer pump and a water separation capability.

Related objects and advantages of the present invention will be apparent from the following description.

DESCRIPTION OF THE PREFERRED EMBODIMENTS

Figure 1:
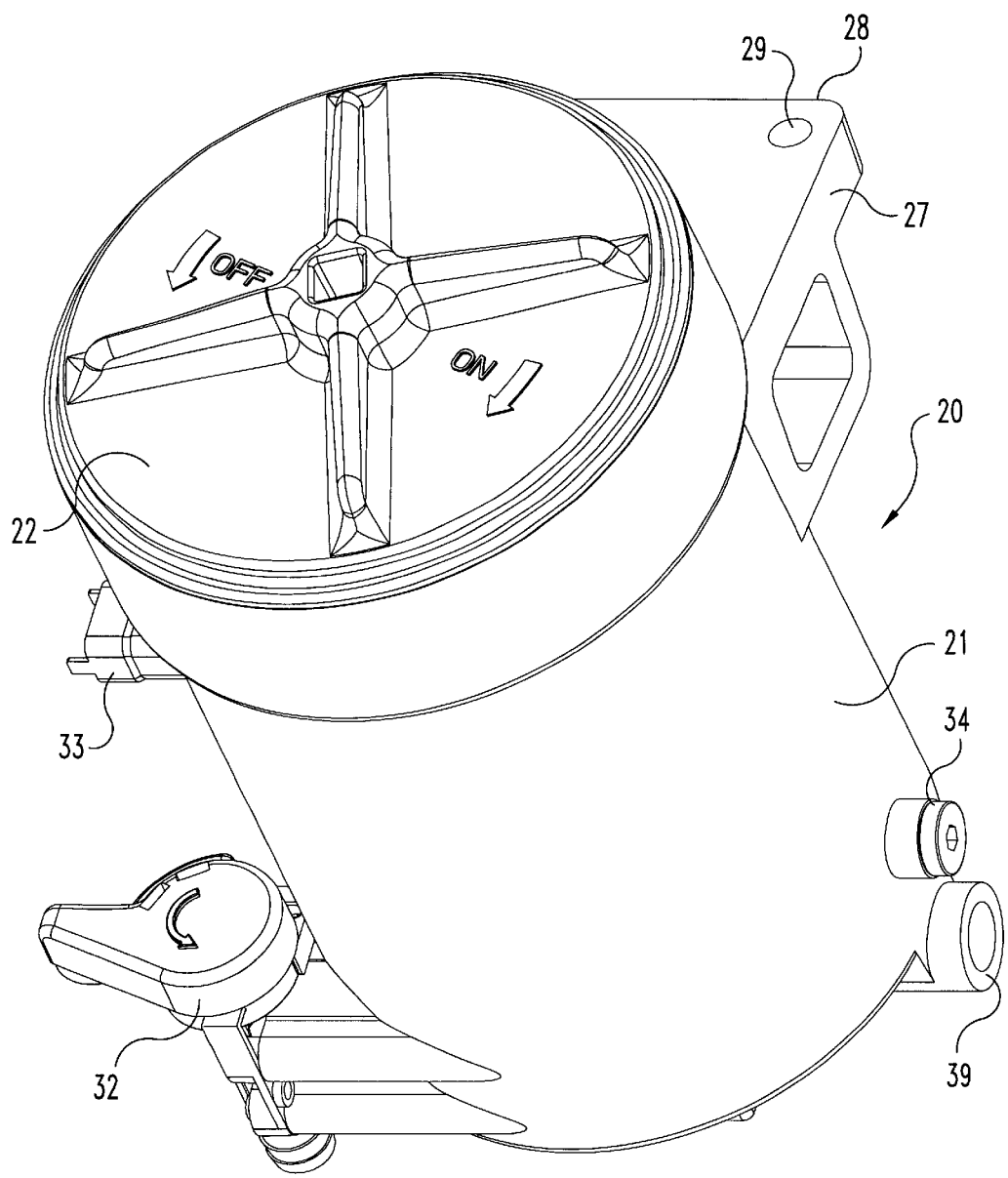
FIG. 1 is a perspective view of a fuel filter assembly, including a fuel transfer pump, according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
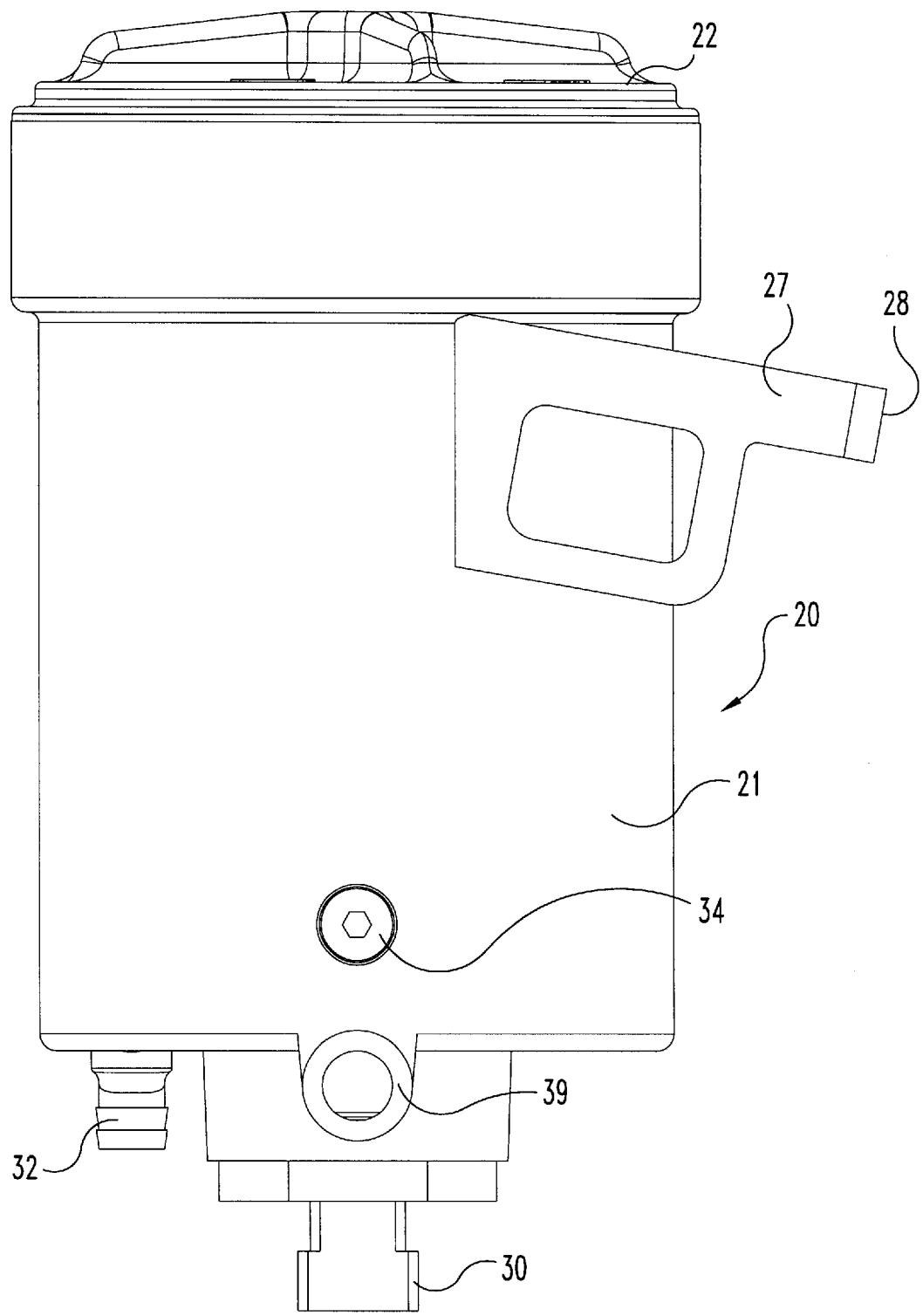
FIG. 2 is a right side elevational view of the FIG. 1 fuel filter assembly.
Figure 3:
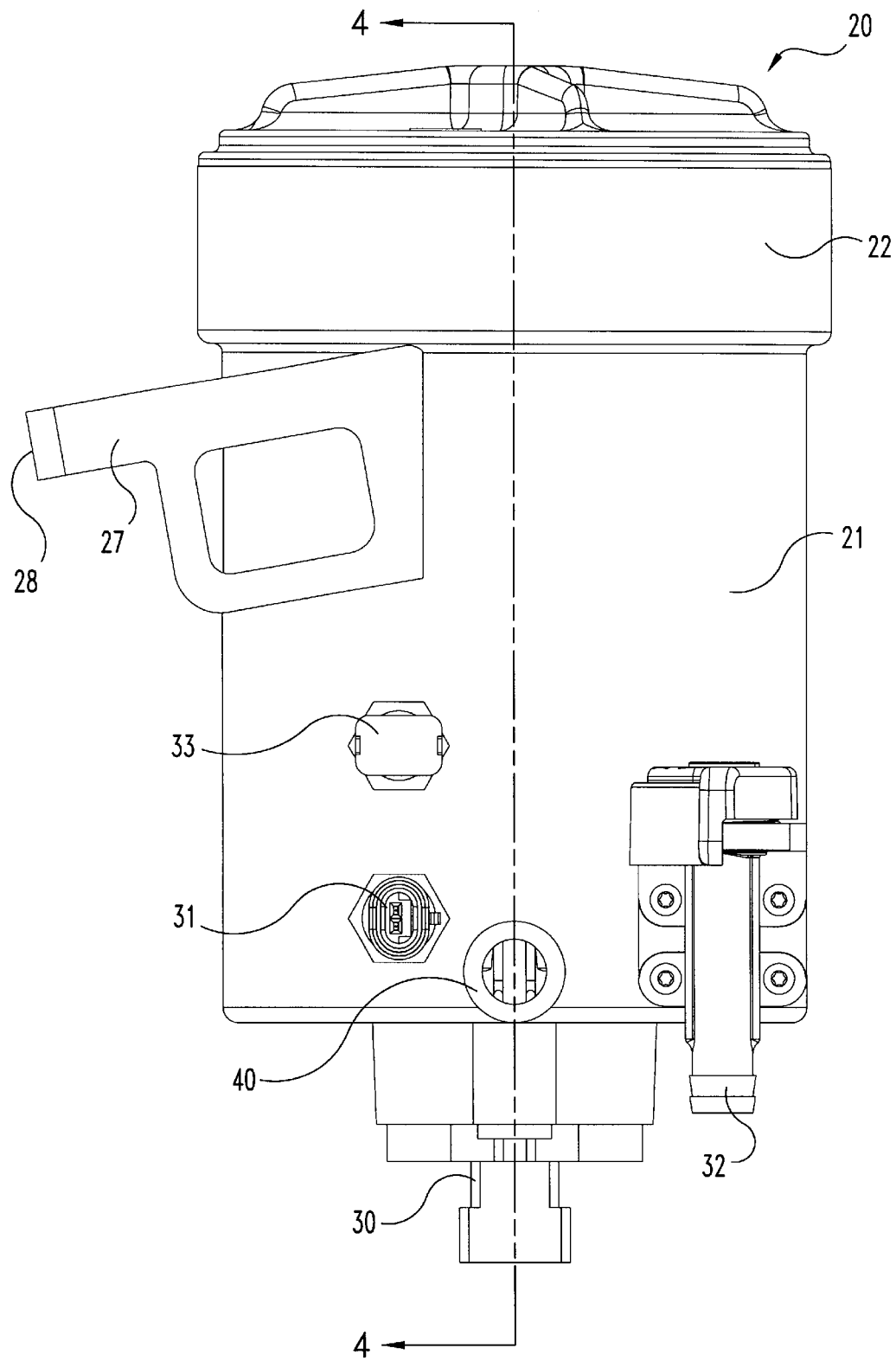
FIG. 3 is a left side elevational view of the FIG. 1 fuel filter assembly.
Figure 4:
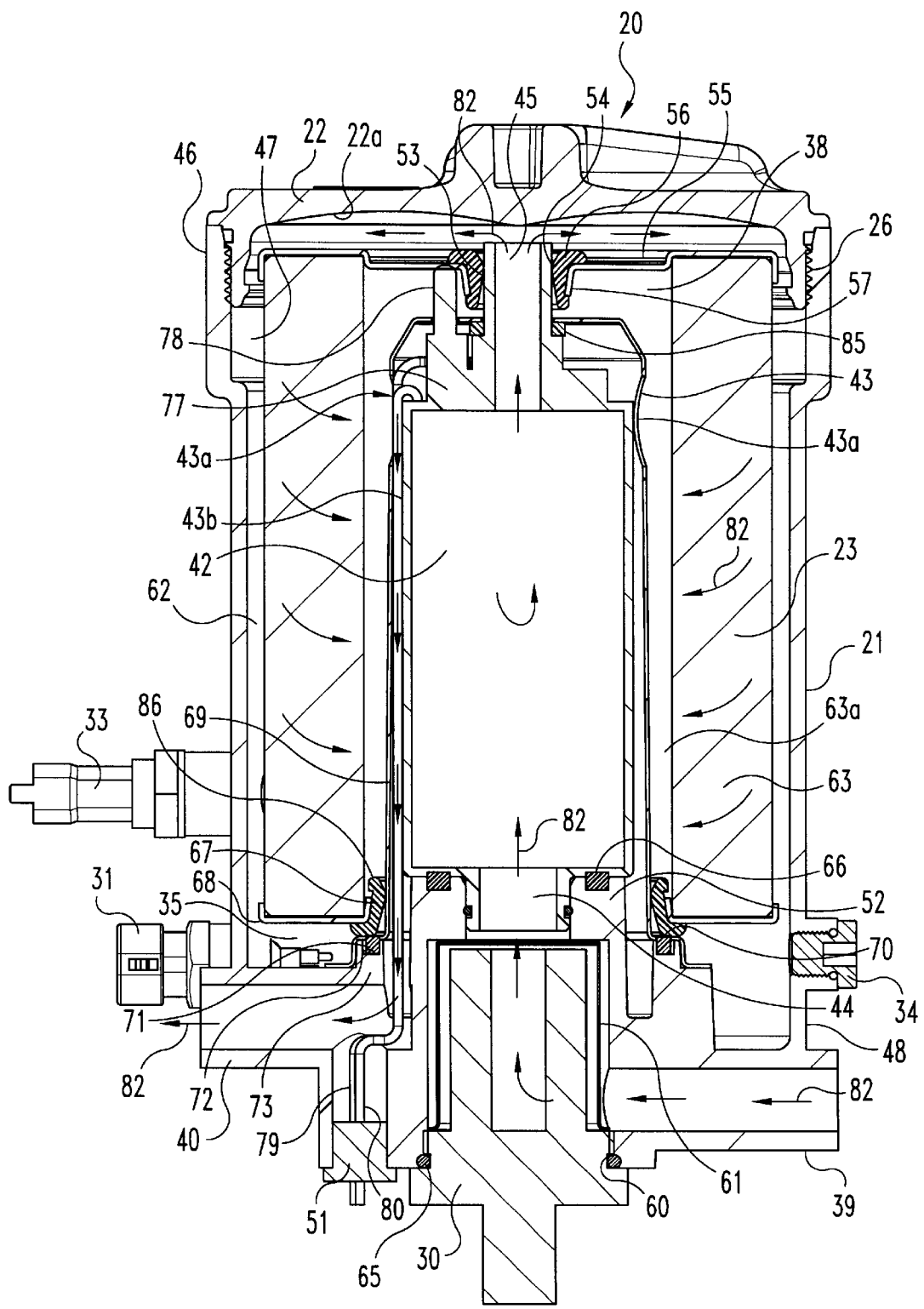
FIG. 4 is a front elevational view, in full section, of the FIG. 1 fuel filter assembly as viewed along line 4—4 in FIG. 3.

Referring to FIGS. 1, 2, and 3, there is illustrated a fuel filter assembly 20 which includes an outer housing or shell 21, a screw-in lid 22, and a fuel filter cartridge 23 which is positioned within the hollow interior of the outer shell 21 (see FIG. 4). The outer shell is preferably a casting which is machined in order to finish selected areas such as the more critical assembly or mounting surfaces, interior features, and the internal threads 26 which receive filter lid 22 by threaded engagement. An alternative construction for outer shell 21 is to create this component by injection molding.

Integrally included as part of outer shell 21 is an engine-mounting bracket 27 which includes a mounting shelf 28 and two clearances holes 29, only one being visible in the FIG. 1 perspective view. Mounting and assembly provisions are constructed and arranged as part of the outer shell casting in order to accept a fuel heater 30, water-in-fuel sensor 31, drain valve 32, temperature sensor 33, and diagnostic port 34. Additionally included as part of outer shell 21 and being arranged in flow communication with the hollow interior 38 of outer shell 21 (see FIG. 4) is a fuel inlet passageway 39 and a fuel outlet passageway 40. Both passageways 39 and 40 are defined by the as-cast configuration of the outer shell 21.

The fuel heater 30 receives the incoming flow of fuel through the fuel inlet passageway 39. The fuel heater is electrically operated so as to provide a moderate preheat, as needed, to the entering fuel in order to reduce the viscosity of the fuel and hopefully prevent the fuel from being in a gel state when it reaches the filter element.

The water-in-fuel sensor 31 can assume a variety of design configurations, and its function is to determine when the level of accumulated water which has been separated from the fuel is at a point that this water should be drained from its collection region 35. The water-in-fuel sensor is typically designed with a pair of contact probes and the conductivity of the circuit path between the probes, contrasting water as opposed to fuel, provides the necessary indication of when the accumulated water has reached a level which is appropriate for the drain function to be activated. The water-in-fuel sensor can either provide a warning light to the operator for manually draining the water by means of drain valve 32 or drain valve 32 can be solenoid actuated such that the drain function occurs automatically in response to the water level and sensor 31.

The water separation capability is provided by the design and construction of the material used for the filtering media. By selecting a material which is water repellent, but which allows the fuel to pass, small particles of water in the fuel collect on the outer surface of the filtering media. Gradually, these small particles of water build up into larger droplets. In time, these larger droplets roll down the outer surface of the filter element and then drip from the filter element and collect beneath the filter cartridge in collection region 35.

The drain valve 32 is located adjacent the water collection region of the outer shell 21 and is operably coupled to a drain opening within the outer shell near the bottom of the water collection region so as to drain a majority of the collected water whenever the drain valve 32 is manually opened or otherwise actuated into an open condition.

The temperature sensor 33 provides a temperature sensing function of the fuel within the fuel filter assembly 20. Since diesel fuel has a tendency to convert into a gel-like state at lower temperatures, and since the processing and filtering of fuel of this viscosity is difficult, there is a desire to preheat the fuel in order to lower the viscosity. There are actually two embodiments of the temperature sensing function associated with the present invention. One embodiment incorporates a thermostat as part of fuel heater 30 which senses the temperature of the incoming fuel via passageway 39. If the incoming fuel has a temperature below 40 degrees F., the fuel heater is turned ON. The fuel heater remains on until the sensed fuel temperature rises to an upper temperature, such as 80 degrees F. In this manner, there will be a wide enough temperature band to preclude frequent, short interval, ON-OFF cycling of the fuel heater due to minor temperature fluctuations. In this embodiment, the sensor function embodied in temperature sensor 33 is used to sense the fuel temperature of the filtered fuel and relays this information to the fuel injection system in order to adjust, as needed, the fuel injection timing due to fuel temperature.

In another embodiment, the temperature sensor and thermostat functions are combined such that the thermostat is not physically placed within the fuel heater package. The sensing probes associated with this combined unit can be placed at any points of interest within the fuel filter assembly. Typically the thermostat controls the ON-OFF cycling of the fuel heater 30 based on the temperature of the fuel which is exiting from the fuel heater before entering the fuel transfer pump 42 (see FIG. 4). Other sensing probes can be used to influence the fuel injection system operation as the temperature of the fuel leaving the fuel filter assembly 20 changes.

The diagnostic port 34 permits the operator to measure fuel pressure in order to diagnose fuel system problems.

With reference now to FIG. 4, one of the novel features of the present invention is illustrated. Assembled into the hollow interior 38 of the outer shell 21 is fuel transfer pump 42. Also included as part of the fuel filter assembly 20 is the replaceable fuel filter cartridge 23. The fuel transfer pump 42 is positioned within center post 43 and both are completely contained within the outer shell 21. Pump 42 is constructed and arranged with a fuel inlet 44 adjacent the fuel heater and a fuel outlet 45 adjacent lid 22. Center post 43 is a generally cylindrical sleeve with an evenly spaced series of four fuel flow apertures 43a which communicate with annular clearance space 43b which is disposed between the outer surface of pump 42 and the inner surface of center post 43.

In the fuel filter assembly orientation of FIG. 4, the "upper" end 46 of the outer shell 21 is substantially open with the inner surface of wall portion 47 being internally-threaded for receipt of lid 22. The "lower" end 48 of the outer shell 21 is substantially closed except for the various openings which are created for the fuel passageways 39 and 40, the fuel heater 30, and an electrical connector 51 which is part of the control and operational circuit for the pump 42. An internal shelf 52 which is cast as part of the outer shell 21 supports the fuel transfer pump 42. The fuel outlet 45 of pump 42 has a generally cylindrical portion 53 which fits through opening 54 in the upper endplate 55 of fuel filter cartridge 23. An annular seal 56 is positioned around and secured to edge 57 of opening 54 in overlapping relation therewith and is sized so as to fit snugly up against and around portion 53 in order to create a liquid-tight seal between edge 57 and portion 53.

Fuel heater 30 is assembled into opening 60 which is in flow communication with fuel inlet passageway 39. A fuel strainer 61 is positioned over and around fuel heater 30 so that any fuel which is handled by heater 30, whether or not heated, is strained before being introduced into pump 42. In this manner, any large particles or other debris that might find its way into the flow of fuel will be strained and separated from the fuel before that fuel is introduced into pump 42. The fuel which is transferred by pump 42 exits through portion 53 which defines the fuel outlet 45 of pump 42. From this point, the fuel flow radially outwardly across the upper surface of endplate 55 into annular clearance space 62 which surrounds a majority of the cylindrical filter element 63. The positive pressure from pump 42 pushes the fuel through the filter element 63 from the outside of the element to the inside of the element and into the hollow interior 38. The filtered fuel then flows toward fuel outlet passageway 40 and exits from the fuel filter assembly 20 via passageway 40. The fuel then flows to the downstream portions of the fuel injection system of the vehicle.

In order to facilitate the described fuel flow path, an annular seal 65 is positioned around the fuel heater 30 and between the fuel heater 30 and opening 60. Another annular seal 66 is positioned between pump 42 and shelf 52. Another annular seal 67 is positioned around and secured to lower endplate 68. Seal 67 is radially compressed between endplate 68 and the generally cylindrical sidewall 69 of center post 43. Seal 67 is axially compressed between horizontal shelf portion 70 of center post 43 and endplate 68. Annular seal 71 is positioned in annular groove 72 of interior portion 73 and located between shelf portion 70 of the center post 43 and interior portion 73 of the outer shell casting.

An electrical filter detector switch 77 is electrically and operably coupled to pump 42 so as to control the operational status of pump 42. The detector switch 77 is part of an electrical circuit which includes electrical connector 51, fuel transfer pump 42, and a source of power external to fuel filter assembly 20. The filter detector switch 77 is electrically connected and hard wired directly to pump 42. Electrical connector 51 is electrically connected and hard wired directly to switch 77 by means of wire lead 79 and to pump 42 by wire lead 80. The purpose of filter detector switch 77 and its corresponding pump-energizing circuit is to prevent operation of the pump and thereby prevent delivery of fuel unless a fuel filter cartridge is properly installed within the outer shell 21. In order to control the operational status of pump 42, the filter detector switch 77 includes a switch plunger 78 which is in a normally-extended, pump-OFF condition. The two wire leads 79 and 80 are positioned between center post 43 and pump 42 in order to provide protection for these wire leads. The switch is wired to one side of pump 42 such that, with power applied to electrical connector 51, the switch 77 controls the operation of pump 42.

When the plunger 78 is pushed downwardly from its normally-extended, pump-OFF condition, the electrical circuit at switch 77, which is normally open, is closed in order to complete the circuit. Assuming that power has in fact been applied to the electrical connector 51, the depression of plunger 78 and the closing of the open circuit by means of switch 77 energizes pump 42, thereby permitting the delivery of fuel to a downstream location. The safety feature which the filter detector switch 77 provides ensures that the pump will not be operational unless a fuel filter cartridge 23 is properly installed. Without a fuel filter cartridge 23 properly installed, assuming that all other components are included and properly assembled, the plunger 78 remains fully extended and is not contacted by the undersurface 22a of lid 22 when the lid is fully threaded into engagement within outer shell 21. In other words, there is sufficient clearance space designed between the undersurface 22a of lid 22 and the tip of plunger 78, such that without a fuel filter cartridge installed, the plunger 78 is not depressed. However, when the fuel filter cartridge 23 is installed, it is sized and positioned such that its upper endplate 55 contacts and pushes down onto plunger 78. As will be seen in the FIG. 4 illustration, the upper endplate 55 can be shaped and contoured so as to guarantee that proper contact of plunger 78 will be made and that there will be sufficient depression of the plunger to close the circuit at switch 77.

When the fuel filter cartridge 23 is installed, it is inserted down onto or over center post 43 so that portion 53 extends up through opening 54. With the fuel filter cartridge 23 fully seated, the upper endplate 55 is brought down onto plunger 78 and pushes the plunger down as the fuel filter cartridge is seated. While system power may not be applied to electrical connector 51 during any type of servicing, repair, or replacement of the fuel filter cartridge, so long as a fuel filter cartridge 23 is properly installed within the outer shell, the pump 42 will be operational as soon as electrical power is applied to connector 51.

The fuel flow (see arrows 82) through fuel filter assembly 20 begins at inlet passageway 39 and flows into the fuel heater 30, up through pump 42, and outwardly into clearance space 62. The fuel passes through filter element 63 into the hollow interior and from there, through flow apertures 43a, downwardly through space 43b, and into fuel outlet passageway 40. With regard to the hollow interior 38, this is intended to denote the hollow interior of the outer shell. As illustrated in FIG. 4, the fuel filter cartridge 23, the fuel transfer pump 42, and the center post 43 all fit within this hollow interior. However, the filter element 63 also includes a hollow interior region 63a which receives the fuel transfer pump 42 and the hollow center post 43.

An alternative embodiment of the present invention replaces the detector switch 77 with an arrangement of spaced electrical contacts positioned in the lower portion of the outer shell and wired into a control circuit which includes electrical connector 51 and fuel transfer pump 42. These spaced electrical contacts correspond to the two electrical contacts in switch 77 which are closed by the depression of plunger 78. In effect, it is these two contacts which must be electrically closed in order to complete the circuit and for power at connector 51 to be delivered to pump 42 in order to energize the pump. In the alternative embodiment, one wire lead from connector 51 goes to one side of pump 42 and the other wire lead goes to one of the two spaced electrical contacts. The other spaced electrical contact is wired to the other side of the fuel transfer pump 42. Consequently, when the two spaced electrical contacts are closed so as to complete the circuit, the fuel transfer pump 42 is energized. In order to bridge across the two spaced-apart electrical contacts, the lower surface of the fuel filter cartridge is configured with a conductive strip which is oriented so as to contact and bridge across the two electrical contacts, when the fuel filter cartridge is properly installed. As before, the pump cannot be energized unless the fuel filter cartridge is properly installed. This ensures that unfiltered fuel cannot be delivered from the fuel filter assembly to the downstream portion of the fuel injection system.

In addition to its enclosing function for pump 42, the center post 43 helps to actually support pump 42. By means of upper annular seal 85, the upper portion of center post 43 is sealed around pump 42 and switch 77. Lower annular seal 71 provides a sealed interface between center post 43 and the casting portion 73. In this manner, the pump 42 is sealed against contact by any "dirty" fuel when the fuel filter cartridge is being replaced. While the four fuel flow apertures 43a would still enable fuel to enter the center post 43 and reach the area of pump 42, the level of the "dirty" fuel during fuel filter cartridge replacement is not high enough to reach the level of apertures 43a.

Since "dirty" fuel may contact the outer surface of sidewall 69, at least on the lower regions, the combination of seal 67 and fuel filter cartridge 23 actually provides a cleaning benefit to the present invention. Since the seal 67 is secured to endplate 68, it becomes part of the fuel filter cartridge 23. The radial seal which is created against center post 43 by means of seal 67 means that the inner edge 86 of seal 67 is normally in a radially inwardly extended orientation prior to installation into the outer shell 21 and onto the center post 43. At the time of insertion onto center post 43, the inner edge 86 of seal 67 is deflected by means of contact with the outer surface of sidewall 69 and actually wipes the sidewall 69, with something like a squeegee action, in order to wipe off any "dirty" fuel residue that may be present on sidewall 69.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fuel filter assembly constructed and arranged for filtering a flow of fuel prior to supplying said fuel to a downstream location and for water separation, said fuel filter assembly comprising:
   an outer shell defining a hollow interior and, at a first end, a fuel inlet passageway, a fuel outlet passageway, and a water collection region, said outer shell having a second end which is open and constructed and arranged to be closed by receipt of a closing member;
   a fuel filter cartridge installed into said hollow interior, said fuel filter cartridge including a filter element, said filter element defining an interior space and being constructed and arranged for water separation;
   a fuel transfer pump installed into said interior space and being operable to push fuel through said filter element; and
   a removable lid constructed and arranged for receipt by said outer shell for closing said second end.

2. The fuel filter assembly of claim 1 which further includes a fuel heater and a thermostat which is constructed and arranged for controlling the operation of said fuel heater.

3. The fuel filter assembly of claim 2 which further includes a filter detector control circuit including a normally-open filter detector switch electrically and operably coupled to said fuel transfer pump for energizing said fuel transfer pump when power is applied and said filter detector switch is closed.

4. The fuel filter assembly of claim 3 wherein said filter detector control circuit includes an electrical connector installed at said first end.

5. The fuel filter assembly of claim 4 which further includes a center post which is positioned within said interior space and located between said filter element and said fuel transfer pump.

6. The fuel filter assembly of claim 5 which further includes drain means for removing collected water from said water collection region.

7. The fuel filter assembly of claim 6 which further includes a fuel temperature sensor for deriving a fuel temperature for use by a fuel injection system.

8. The fuel filter assembly of claim 1 which further includes a filter detector control circuit including a normally-open filter detector switch electrically and operably coupled to said fuel transfer pump for energizing said fuel transfer pump when power is applied and said filter detector switch is closed.

9. The fuel filter assembly of claim 8 wherein said filter detector control circuit includes an electrical connector installed at said first end.

10. The fuel filter assembly of claim 9 which further includes a center post which is positioned within said interior space and located between said filter element and said fuel transfer pump.

11. The fuel filter assembly of claim 1 which further includes drain means for removing collected water from said water collection region.

12. A fuel filter assembly for filtering a flow of fuel prior to supplying said fuel to a downstream location, said fuel filter assembly comprising:
    an outer shell defining a hollow interior and, at a first end, a fuel inlet passageway and a fuel outlet passageway, said outer shell having a second end which is open and constructed and arranged to be closed by receipt of a closing member;
    a fuel filter cartridge installed into said hollow interior, said fuel filter cartridge including a filter element defining an interior space;
    a fuel transfer pump installed into said interior space and being operable to push fuel through said filter element;
    a filter detector control circuit including a normally-open filter detector switch electrically and operably coupled to said fuel transfer pump for energizing said fuel transfer pump when power is applied and said filter detector switch is closed; and
    a removable lid constructed and arranged for receipt by said outer shell for closing said second end.

13. The fuel filter assembly of claim 12 which further includes a fuel heater and a thermostat which is constructed and arranged for controlling the operation of said fuel heater.

14. The fuel filter assembly of claim 13 wherein said filter detector switch includes a plunger which is extended in said normally-open condition and is constructed and arranged to control the condition of said filter detector switch.

15. The fuel filter assembly of claim 14 wherein said fuel filter cartridge includes an endplate which is constructed and arranged for depressing said plunger when said fuel filter cartridge is installed in said outer shell, the depressing of said plunger closing said filter detector switch.

16. The fuel filter assembly of claim 15 wherein said outer shell defines a water collection region and said filter element is constructed and arranged for water separation.

17. The fuel filter assembly of claim 16 which further includes drain means for removing collected water from said water collection region.

18. The fuel filter assembly of claim 12 wherein said filter detector switch includes a plunger which is extended in said normally-open condition, and is constructed and arranged to control the condition of said filter detector switch.

19. The fuel filter assembly of claim 18 wherein said fuel filter cartridge includes an endplate which is constructed and arranged for depressing said plunger when said fuel filter cartridge is installed in said outer shell, the depressing of said plunger closing said filter detector switch.

20. The fuel filter assembly of claim 12 wherein said outer shell defines a water collection region and said filter element is constructed and arranged for water separation.

21. The fuel filter assembly of claim 20 which further includes drain means for removing collected water from said water collection region.

22. A fuel filter assembly for filtering a flow of fuel prior to supplying said fuel to a downstream location, said fuel filter assembly comprising:

an outer shell defining a hollow interior and, at a first end, a fuel inlet passageway and a fuel outlet passageway, said outer shell having a second end which is open and constructed and arranged to be closed by receipt of a closing member;

a fuel filter cartridge installed into said hollow interior, said fuel filter cartridge including a filter element defining an interior space;

a fuel transfer pump installed into said interior space and being operable to push fuel through said filter element;

a fuel heater installed in said first end of said outer shell and being constructed and arranged for receipt of fuel from said fuel inlet passageway;

a temperature sensor and thermostat unit installed into said outer shell and being constructed and arranged for controlling the operation of said fuel heater based upon the temperature of the fuel leaving said fuel heater; and a removable lid constructed and arranged for receipt by said outer shell for closing said second end.

* * * * *